United States Patent [19]

Matsuda et al.

[11] Patent Number: 5,247,514
[45] Date of Patent: Sep. 21, 1993

[54] MULTIPLE CHANNEL TRANSIT CALL CONTROL APPARATUS

[75] Inventors: Sin-ichiro Matsuda; Masaki Ohta, both of Tokyo, Japan

[73] Assignee: NEC Corporation, Tokyo, Japan

[21] Appl. No.: 742,091

[22] Filed: Aug. 8, 1991

[30] Foreign Application Priority Data

Aug. 9, 1990 [JP] Japan .................................. 2-209222
Oct. 8, 1990 [JP] Japan .................................. 2-268499

[51] Int. Cl.⁵ ...................... H04Q 11/04; H04M 3/50
[52] U.S. Cl. ..................... 370/61; 370/58.2; 379/88
[58] Field of Search ..................... 370/58.1, 58.2, 58.3, 370/61, 62; 379/84, 88, 89, 93, 94

[56] References Cited

U.S. PATENT DOCUMENTS

| | | | |
|---|---|---|---|
| 4,166,929 | 9/1979 | Sheinbein .............................. | 370/61 |
| 4,385,359 | 5/1983 | Watari et al. ......................... | 379/88 |
| 4,653,085 | 3/1987 | Chan et al. ........................... | 370/58.2 |
| 4,887,076 | 12/1989 | Kent et al. ............................ | 370/61 |
| 4,920,534 | 4/1990 | Adelmann et al. ................ | 370/94.1 |
| 5,020,095 | 5/1991 | Morganstein et al. ............... | 379/88 |

*Primary Examiner*—Douglas W. Olms
*Assistant Examiner*—Alpus H. Hsu
*Attorney, Agent, or Firm*—Foley & Lardner

[57] ABSTRACT

A multiple channel transit call control apparatus includes a transit message storage queue unit, a node message counter, a node transit trunk call opportunity message definition count memory, and a control unit. The transit message storage queue unit stores transit messages arriving at a storage and forward switching system according to destination node identity. The node message counter counts messages in the transit message storage queue unit according to destination node identity. The node transit trunk call opportunity message definition count memory defines the number of channels to be called for every predetermined count of the node message counter according to destination node identity. The control unit outputs a call request signal when the value of the node message counter exceeds a predetermined count stored in the node transit trunk call opportunity message definition count memory.

7 Claims, 3 Drawing Sheets

MULTIPLE CHANNEL TRANSIT CALL CONTROL APPARATUS

BACKGROUND OF THE INVENTION

The present invention relates to a transit connection in a storage and forward switching system and, more particularly, to a multiple channel or transit trunk call control apparatus for transferring a transit message (packet) by call-disconnecting a switching network between switching offices.

In transfer between conventional storage and forward switching apparatuses of this type, calling is immediately performed when a transit message is stored even if switching offices are connected by leased lines or by a call disconnection type connection. In addition, calling can be controlled in only one channel with respect to one node between switching offices.

In the above conventional inter-switching-office system, when offices are connected through leased lines, a transit line cannot be used if the line is a switching network. Even in the call disconnection type connection which can use a switching network, if a switching network of a measured rate charging or cost system is used as a transit line, often only one message is can be transferred by one call connection rather than a plurality of messages. Therefore, an initial flat rate charging or cost range for the switching network cannot be effectively used.

In addition, in order to control a plurality of channels, independent call connection is performed for each channel. Therefore, multiple channel control taking into consideration a charging or cost system of a network cannot be performed (e.g., calling of the second channel is stopped when calling of the first channel is more inexpensive, or a subsequent channel is called to shorten storage time in accordance with a call amount).

SUMMARY OF THE INVENTION

It is an object of the present invention to provide a multiple channel or transit trunk call control apparatus capable of performing multiple channel control taking a charging or cost system of a network into consideration.

It is another object of the present invention to provide a multiple channel or transit trunk call control apparatus capable of effectively using an initial flat rate cost range of a switching system to reduce communication cost.

It is still another object of the present invention to provide a multiple channel or transit trunk call control apparatus capable of rapidly transferring a transit message without storing it for a predetermined time period or more.

In order to achieve the above objects of the present invention, there is provided a multiple channel transit call control apparatus comprising transit message storage queue means for storage transit messages arriving at a storage and forward switching system in units of nodes, a node message counter for counting messages in the transit message stay queue means in according to destination node identity, a node transit trunk call opportunity message definition count memory for defining the number of channels to be called for every predetermined count of the node message counter in according to destination node identity, and control means for outputting a call request signal when the value of the node message counter exceeds a predetermined count stored in the node transit trunk call opportunity message definition count memory.

DETAILED DESCRIPTION OF THE PREFERRED EMBODIMENT

Figure 1:
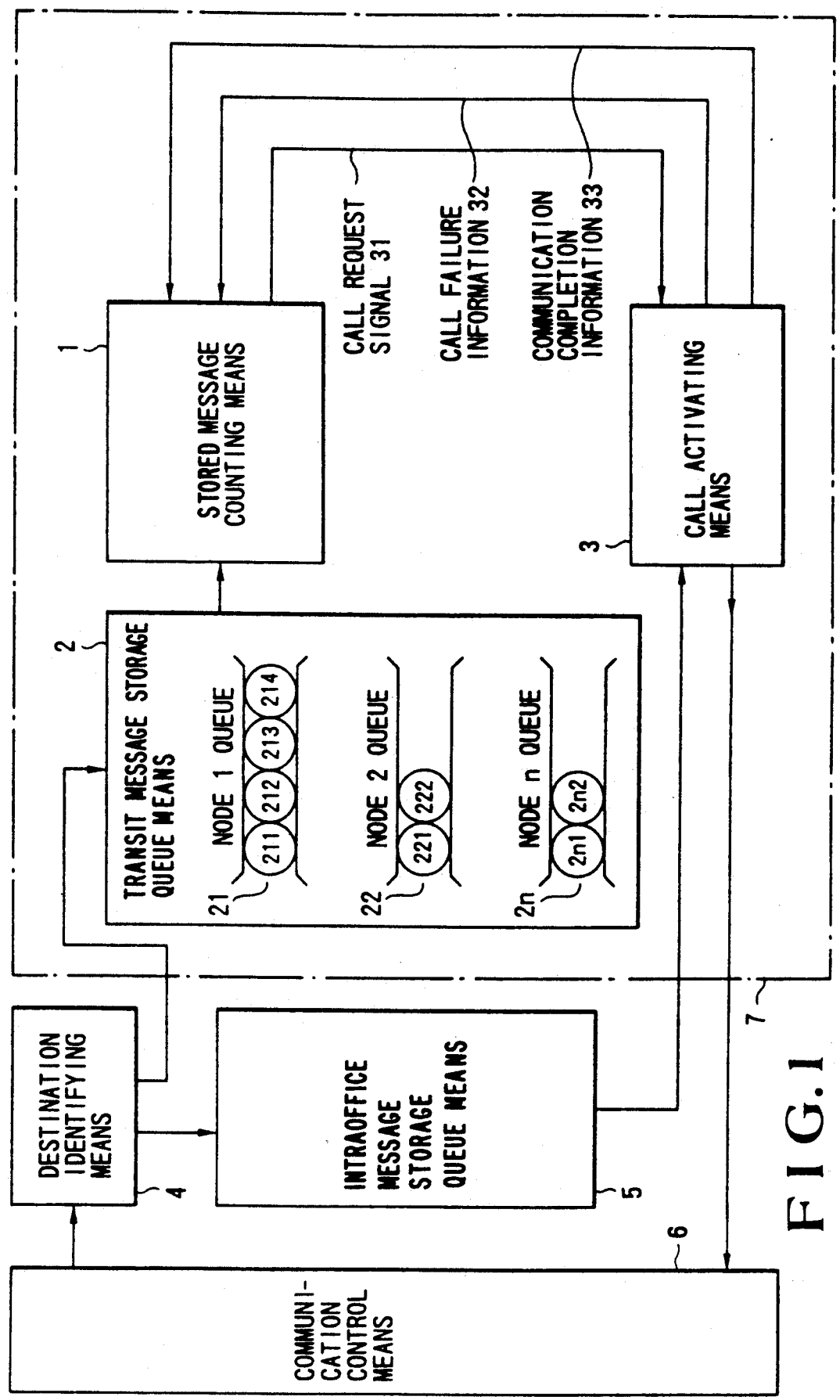
FIG. 1 is a block diagram showing an arrangement of the present invention.

FIG. 1 shows an arrangement of the present invention, in which a transit call control apparatus 7 comprises a stored message counting means 1, a transit message storage queue means 2, and a call activating means 3. A storage and forward switching system comprises a communication control means 6 for controlling communication procedure with respect to terminal equipment, and a destination identifying means 4 for receiving a communication destination designation from the communication control means and identifying the destination to determine whether the message is an intraoffice message or a message for another node. If the message is for another node, the destination identifying means 4 registers the message queues in according to destination node identity in the transit message storage queue means 2. If the message is an intraoffice message, the destination identifying means 4 registers the message in an intraoffice message storage queue means 5. The transit message storage queue means 2 stores messages arriving according to destination node identity in queues $2_1, 2_2, \ldots, 2_n$. The stored message counting means 1, although it will be described in detail later, measures an increase or decrease in queues to determine the number of channels to be used every time the number of messages stored in queues according to destination node identity reaches a predetermined value. The call activating means 3 performs calling for a necessary number of channels in accordance with a call request signal 31 from the stored message counting means 1. Reference numeral 32 denotes a call failure information signed; and 33, a communication completion information signal.

Figure 2:
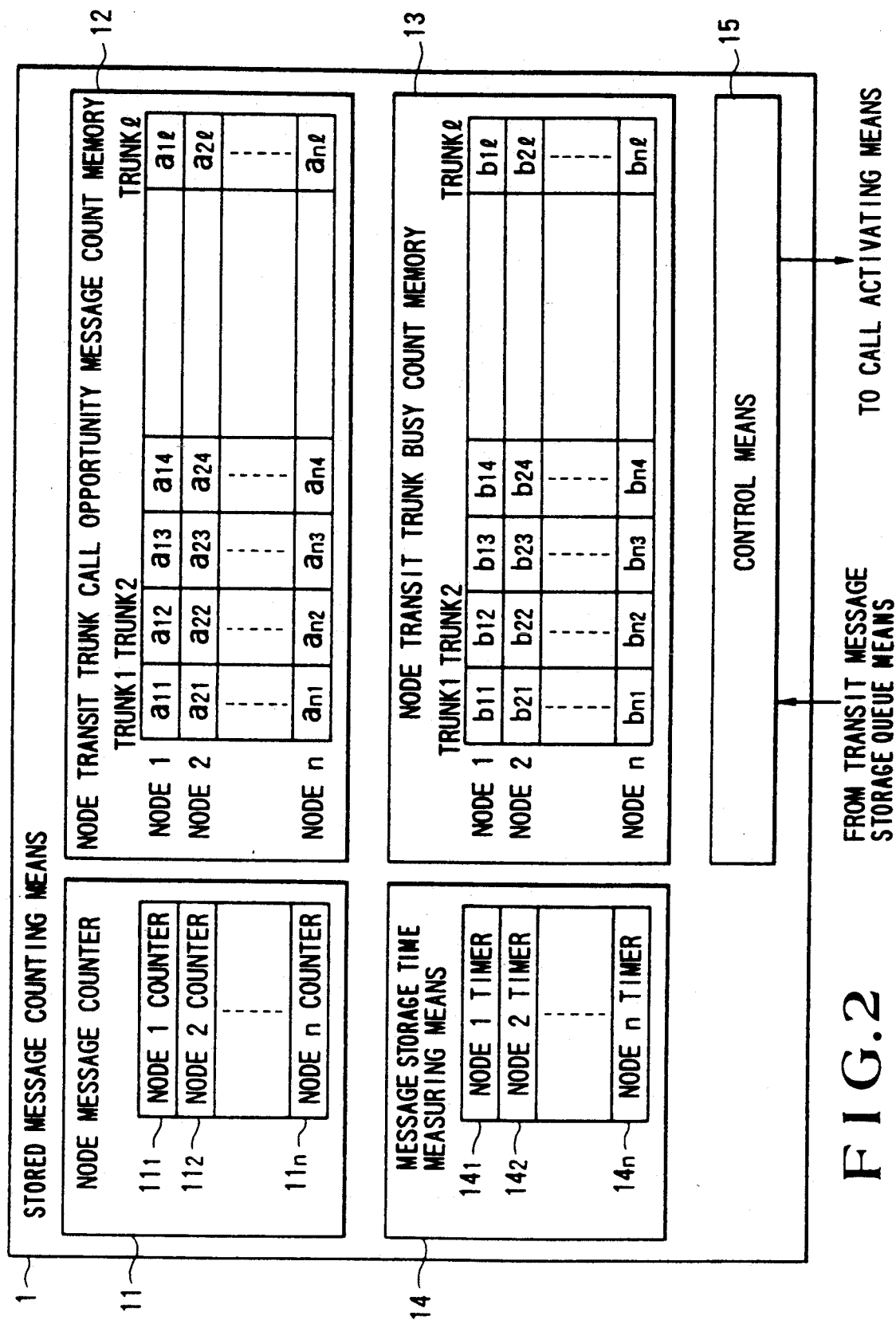
FIG. 2 is a block diagram showing in detail a stayed message counting means 1 shown in FIG. 1.
Figure 3:
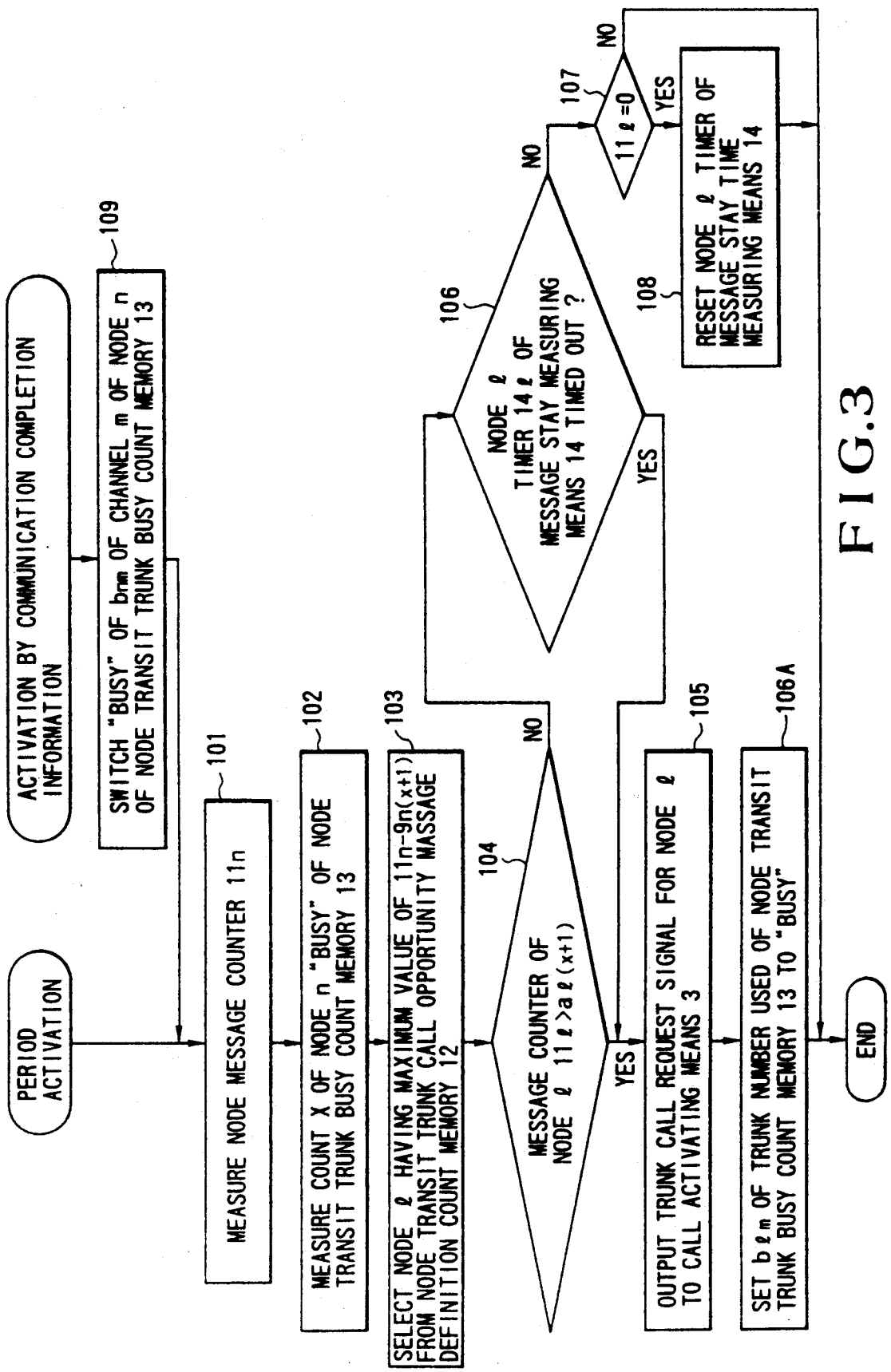
FIG. 3 is a flow chart for explaining an operation of the present invention.

As shown in FIG. 2, the stored stayed message counting means 1 comprises a node message counter 11 for holding the number of messages stored in node queues of the transit message storage queue means 2 according to destination node identity, a message storage time measuring means 14 for setting a timer corresponding to a node for which a message is registered, a node channel or transit trunk call opportunity message definition count memory 12 for defining the number of channels to be called in accordance with the count of the node message counter 11, a node transit trunk busy count memory 13 for holding the number of channels used according to destination node identity, and a control means 15 for controlling the memories and the counter and controlling determination of a call request. Note that the node message counter 11 comprises a node 1 counter $11_1$, a node 2 counter $11_2, \ldots$, a node n counter $11_n$. In addition, the message storage time measuring means 14 comprises a node 1 timer $14_1$, a node 2 timer $14_2, \ldots$, a node n timer $14_n$.

The operation of the above apparatus will be described below. The node transit trunk call opportunity message definition count memory 12 defines beforehand the number of transit trunks or channels to be called when the node message counter 11 reaches a certain value. For example, assuming that one channel is called when the node message counter $11_1$ for a node 1 reaches "3", 3 is defined in $a_{11}$, and assuming that a total of two channels are called when the node message counter $11_1$ reaches "6", 6 is defined in $a_{12}$.

The node message counter 11 adds the number of messages registered according to destination node identity in accordance with a signal from the transit message storage queue means 2. When registration is initially performed for a node, the timer of the message storage time measuring means 14 is set.

The channel call algorithm for the multiple channel transit call apparatus performed by the control means 15 will be described below.

There are two methods for activating the stored message counting means 1; one is period activation, and the other is activation caused by a communication completion information signal 33 from the call activating means 3.

(1) Period Activation

When activation is performed by period activation, the node message counter $11_n$ is measured (step 101), and a count x for node n "busy" in the node transit trunk busy count memory 13 is measured (step 102).

A message count $a_{n(x+1)}$ to be called with respect to count x is calculated from the node transit trunk or channel call opportunity message definition count memory 12, $11_n - a_{n(x+1)}$ is calculated for each node, and a node l having the maximum value is selected (step 103).

The message count 11, and the next channel call count $a_{l(x+1)}$ for the node l are compared with each other (step 104). If the message count $11_l$ is larger than the next channel call count $a_{l(x+1)}$, a channel call request signal 31 for the node l is output to the call activating means 3 (step 105), and $b_{lm}$ of the channel number used in the node transit trunk busy count memory 13 is set to "busy" (step 106A).

If $11_l < a_{l(x+1)}$, a check is made to determine whether the node l timer $14_l$ of the message storage time measuring means 14 is timed out (step 106). If the timer is timed out, the call request signal 31 is similarly output (step 105). If the timer is not timed out, a check is made to determine whether the node message counter $11_l$ is "0" (step 107). If the counter is "0", the node l timer $14_l$ of the message storage time measuring means 14 is reset (step 108), and processing is ended.

(2) Activation caused by a communication completion in information signal 33 from call activating means 3

When the call activating means 3 outputs the communication completion information signal 33 indicating that the mth channel is completed for the node n in the message storage measuring means 1, "busy" for $b_{nm}$ of the channel m of the node n in the node transit trunk busy count memory 13 is set to "empty" (step 109). Thereafter, a channel call is selected in steps 101 to 108 in exactly the same manner as in the period activation method.

As has been described above, according to the present invention, since the number of channels to be called is defined in accordance with the number of stored messages, multiple channel control taking a charging or cost system for a network into consideration can be performed. In addition, since a plurality of channels are simultaneously connected to a specific node, an inter-switching-office channel is prevented from being exclusively connected to the specific node. Furthermore, when calling is performed in accordance with only the number of stored messages, message arrival time is prolonged if the number of messages is small. According to the present invention, however, since calling is performed in accordance with the time elapsed from arrival time, transfer within a predetermined time period can be assured.

What is claimed is:

1. A multiple channel transit call control apparatus comprising:

transit message storage queue means for receiving and storing transit messages in a plurality of queues, said queues being respectively designated for separate destination nodes for said transit messages;

a node message counter for counting said transit messages stored in said transit message storage queue means according to each destination node of said destination nodes;

a node transit trunk call opportunity message definition count memory for storing a predetermined count and a number indicating channels to be called for said predetermined count for said each destination node; and control means for outputting a call request signal when a count in said node message counter exceeds said predetermined count stored in said node transit trunk call opportunity message definition count memory.

2. An apparatus according to claim 7, further comprising message storage time measuring means for counting a time period after a transit message of said transit messages is received by said transit message storage queue means, and wherein said control means outputs said call request signal when said message storage time measuring means counts a predetermined value for said time period.

3. An apparatus according to claim 1, wherein said control means periodically measures a count of said node message counter and data in said node transit trunk call opportunity message definition count memory, selects a node having a largest number of stored transit messages, and checks whether said call request signal is necessary for said node having said largest number of stored transit messages.

4. An apparatus according to claim 1, wherein said control means checks a count of said node message counter and data in said node transit trunk call opportunity message definition count memory upon receiving an input communication completion information signal, selects a node having a largest number of stored transit messages, and checks whether said call request signal is necessary for said node having said largest number of stored transit messages.

5. An apparatus according to claim 1, further comprising call activating means for outputting an activation signal for external communication control upon receiving said call request signal from said control means.

6. An apparatus according to claim 7, further comprising a node transit trunk busy count memory for holding a number indicating channels used for said each destination node, and wherein said control means rewrites contents of said busy count memory in accordance with said number indicating channels used.

7. An apparatus according to claim 6, wherein said control means, upon receiving an input communication completion information signal, switches particular data indicating a state of a particular channel of a particular node held in said node transit trunk busy count memory from "busy" to "empty".

* * * * *

UNITED STATES PATENT AND TRADEMARK OFFICE
CERTIFICATE OF CORRECTION

PATENT NO. : 5,247,514
DATED : September 21, 1993
INVENTOR(S) : Matsuda, et al.

It is certified that error appears in the above-indentified patent and that said Letters Patent is hereby corrected as shown below:

On the title page, item [21] should read as follows:
--[21]  Appl. No.  742,031--.

Signed and Sealed this

Nineteenth Day of July, 1994

Attest:

BRUCE LEHMAN

*Attesting Officer*    *Commissioner of Patents and Trademarks*